(12) United States Patent
Ishibashi et al.

(10) Patent No.: US 10,290,974 B2
(45) Date of Patent: May 14, 2019

(54) CONNECTOR DEVICE

(71) Applicants: Sumitomo Wiring Systems, Ltd., Yokkaichi-shi, Mie (JP); HONDA MOTOR CO., LTD., Tokyo (JP)

(72) Inventors: Takeshi Ishibashi, Yokkaichi (JP); Tadahiro Fukushima, Wako (JP); Takahiro Hagimoto, Wako (JP); Tsukasa Aiba, Wako (JP)

(73) Assignees: Sumitomo Wiring Systems, Ltd. (JP); Honda Motor Co., Ltd. (JP)

( * ) Notice: Subject to any disclaimer, the term of this patent is extended or adjusted under 35 U.S.C. 154(b) by 39 days.

(21) Appl. No.: 15/545,737

(22) PCT Filed: Jan. 12, 2016

(86) PCT No.: PCT/JP2016/050637
§ 371 (c)(1),
(2) Date: Jul. 24, 2017

(87) PCT Pub. No.: WO2016/121481
PCT Pub. Date: Aug. 4, 2016

(65) Prior Publication Data
US 2018/0006401 A1  Jan. 4, 2018

(30) Foreign Application Priority Data
Jan. 28, 2015 (JP) ................. 2015-014045

(51) Int. Cl.
*B60L 3/00* (2019.01)
*H02K 5/22* (2006.01)
(Continued)

(52) U.S. Cl.
CPC ........ *H01R 13/6315* (2013.01); *B60L 15/007* (2013.01); *H01R 13/05* (2013.01);
(Continued)

(58) Field of Classification Search
CPC .............. H01R 13/6215; H01R 13/621; H01R 13/6315; H01R 13/05; H01R 13/28;
(Continued)

(56) References Cited

U.S. PATENT DOCUMENTS 6,257,918 B1  7/2001  Yamamoto
8,408,927 B2  4/2013  Tashiro
(Continued)

FOREIGN PATENT DOCUMENTS

CN  101651278 A  2/2012
JP  S63-138232 U  9/1988
(Continued)

OTHER PUBLICATIONS

International Search Report dated Apr. 5, 2016.
Chinese Office Action dated Aug. 27, 2018.
Japanese Office Action dated Sep. 6, 2018.

*Primary Examiner* — Gary F Paumen
(74) *Attorney, Agent, or Firm* — Gerald E. Hespos; Michael J. Porco; Matthew T. Hespos

(57) ABSTRACT

A connector device includes a motor-side connector 30 including a motor-side terminal 31, an inverter-side connector 60 including an inverter-side terminal 70, a motor case 10 including the motor-side connector 30, and an inverter case 50 including the inverter-side connector 60, the connectors 30, 60 being fitted together when the inverter case 50 is stacked on and fastened to the motor case 10 using bolts 120. When the fastening of the cases 10, 50 is completed, a predetermined gap is ensured between opposing surfaces 36B, 80A of the connectors 30, 60.

5 Claims, 17 Drawing Sheets

(51) Int. Cl.
  *B60L 15/00* (2006.01)
  *H01R 12/91* (2011.01)
  *H01R 13/05* (2006.01)
  *H01R 13/28* (2006.01)
  *H01R 13/52* (2006.01)
  *H02K 11/33* (2016.01)
  *H01R 13/514* (2006.01)
  *H01R 13/621* (2006.01)
  *H01R 13/631* (2006.01)

(52) U.S. Cl.
  CPC .......... *H01R 13/621* (2013.01); *H02K 5/225* (2013.01); *B60L 3/003* (2013.01); *H01R 12/91* (2013.01); *H01R 13/28* (2013.01); *H01R 13/514* (2013.01); *H01R 13/5202* (2013.01); *H01R 2201/26* (2013.01); *H02K 11/33* (2016.01); *Y02T 10/641* (2013.01); *Y02T 10/645* (2013.01)

(58) Field of Classification Search
  CPC .. H01R 13/514; H01R 13/5202; H01R 12/91; B60L 11/1818; B60L 15/007; B60L 3/003; H02K 5/225; H02K 11/33; Y02T 10/645; Y02T 10/641
  USPC .................................................. 439/364, 362
  See application file for complete search history.

(56) References Cited

U.S. PATENT DOCUMENTS

| | | | |
|---|---|---|---|
| 8,465,313 B2 * | 6/2013 | Shibata | H01R 13/5202 439/271 |
| 8,622,674 B2 * | 1/2014 | Shibata | H01R 13/6215 411/105 |
| 9,209,540 B2 * | 12/2015 | Raff | H01R 12/716 |
| 2012/0015546 A1 | 1/2012 | Yamaguchi et al. | |

FOREIGN PATENT DOCUMENTS

| | | |
|---|---|---|
| JP | 2-59584 | 5/1990 |
| JP | 2010-225488 | 10/2010 |
| WO | 2010/110032 | 9/2010 |

* cited by examiner

CONNECTOR DEVICE

BACKGROUND

1. Field of the Invention.

The present invention relates to a connector device used for electrically connecting a motor and an inverter.

2. Description of the Related Art.

In electric vehicles and hybrid vehicles, when a motor and an inverter are electrically connected, motor terminals (connector) and inverter terminals (connector) are conventionally connected using a wire harness.

In recent years, for space saving purposes, for example, a connector device has been proposed in which a motor-side connector including motor-side terminals in a motor case and an inverter-side connector including inverter-side terminals in an inverter case are mounted so as to oppose each other, and the inverter case is directly connected to the motor case by bolting, thereby fitting the respective connectors to each other and connecting the respective terminals. An example of the connector device is disclosed in Japanese Patent Application Laid-Open No. 2010-225488.

In the above structure, when the connectors are mounted to the corresponding cases, axial variations may be introduced into the mounting positions, for example. In this case, the opposed connectors may be fitted to each other with their opposing surfaces abutted on each other before the cases are completely stacked one above the other, and then the cases may be bolted and laid on each other. As a result, the connectors may be fitted to each other in a state of being excessively loaded, or the wall surfaces of the cases may be deformed from the connector arranged positions and subjected to bending stress.

The present invention was made in view of the above circumstances. An object of the present invention is to ensure regular fitting-together of connectors of a type in which a motor-side connector and an inverter-side connector are fitted together when cases are stacked one above the other and fastened to each other by bolting, while avoiding the connectors being subjected to excessive load or the cases being subjected to bending stress.

SUMMARY

According to the present invention, a connector device includes a motor-side connector including a motor-side terminal; an inverter-side connector including an inverter-side terminal; a motor case including the motor-side connector; and an inverter case including the inverter-side connector, the connectors being fitted together when the inverter case is stacked on and fastened to the motor case by bolting. When the fastening of the cases is completed, a predetermined gap is ensured between opposing surfaces of the connectors.

When the fastening of the cases is completed, a predetermined gap is ensured between the opposing surfaces of the connectors fitted together. Accordingly, even if the inverter-side connector or the motor-side connector is mounted with a positional displacement in a direction toward the opposite connector with respect to the cases, the cases are fastened to each other by bolting before the opposing surfaces of the connectors are abutted on each other. As a result, the connectors can be regularly fitted together while avoiding the connectors being subjected to excessive load or the cases being subjected to bending stress.

The following configurations may be adopted.

(1) The inverter case may include a wall portion opposing the motor case, the wall portion having an insertion hole opened therein, with a fitting bolt that is threadedly engaged with a screw hole formed in the motor case penetrating through the insertion hole in an axially rotatable manner, the wall portion being sandwiched between two, upper and lower, flanges disposed at a predetermined interval greater than a thickness of the wall portion. The motor case may include a regulating portion for regulating an amount of threaded advancement of the fitting bolt into the screw hole. The inverter case may be set to be pulled to a position before being stacked on the motor case when the threaded advancement of the fitting bolt is stopped.

As the fitting bolt is threaded into the screw hole and fastened, the inverter case is pulled toward the motor case with the upper flange pressing the wall portion, whereby the connectors are gradually fitted together. When the fitting bolt has threadedly advanced by a predetermined amount, further fastening of the fitting bolt is stopped by the regulating portion. At this point, the inverter case remains at a position before being stacked on the motor case, and also the connectors remain at positions before being regularly fitted together. Then, when bolts disposed between the cases are fastened, the wall portion is lowered toward the lower flange, and the inverter case is stacked on and fastened to the motor case, whereby the connectors are regularly fitted together.

If the structure is such that the inverter case is pulled until being completely stacked on the motor case and fastened to the motor case by the fitting bolt, a stress may be applied to the fastened position of the fitting bolt when the cases are finally fastened to each other by bolting if the inverter case is in a floating state from the motor case at the bolt fastened position between the cases due to, e.g., inverter case molding error or deformation.

In contrast, the present invention is structured such that, in the fastened position of the fitting bolt, the lowering of the wall portion of the inverter case is permitted. Accordingly, the cases can be fastened to each other and the connectors can be regularly fitted together while avoiding the stress being applied to the fastened position of the fitting bolt.

(2) The motor case may include two of the motor-side connectors, the inverter case may include two of the inverter-side connectors, the motor-side connectors and the inverter-side connectors opposing each other. The fitting bolt maybe between the inverter-side connectors and the screw hole maybe between the motor-side connectors such that the fitting bolt and the screw hole are opposite each other.

Because in this structure, the fitting bolt and the screw hole constituting a boosting mechanism are disposed at a single location between the two sets of connectors fitted to each other, the structure is simple and yet enables the sets of connectors to be efficiently and accurately fitted together.

(3) The connector device may further include a positioning mechanism disposed at the fitting bolt and the screw hole, the positioning mechanism positioning the inverter-side connectors and the motor-side connectors to be fit each other and opposite each other to be coaxially disposed when the inverter case is stacked on the motor case.

When the inverter case is stacked on the motor case, the inverter case is positioned by the positioning mechanism, whereby the inverter-side connectors and the corresponding motor-side connectors are aligned. Because the structure is simple with the positioning mechanisms disposed at a single location between the two sets of connectors, the respective sets of connectors can be aligned accurately. The positioning mechanisms are disposed in a dead space where the fitting bolt and the screw hole are disposed, and can therefore contribute to saving spaces.

The present invention ensures a regular fitting-together of connectors of a type in which a motor-side connector and an inverter-side connector are fitted together when cases are stacked one above the other and fastened to each other by bolting, while avoiding the connectors being subjected to excessive load or the cases being subjected to bending stress.

DETAILED DESCRIPTION

A first embodiment of the present invention will be described with reference to FIG. 1 to FIG. 15.

Figure 5:
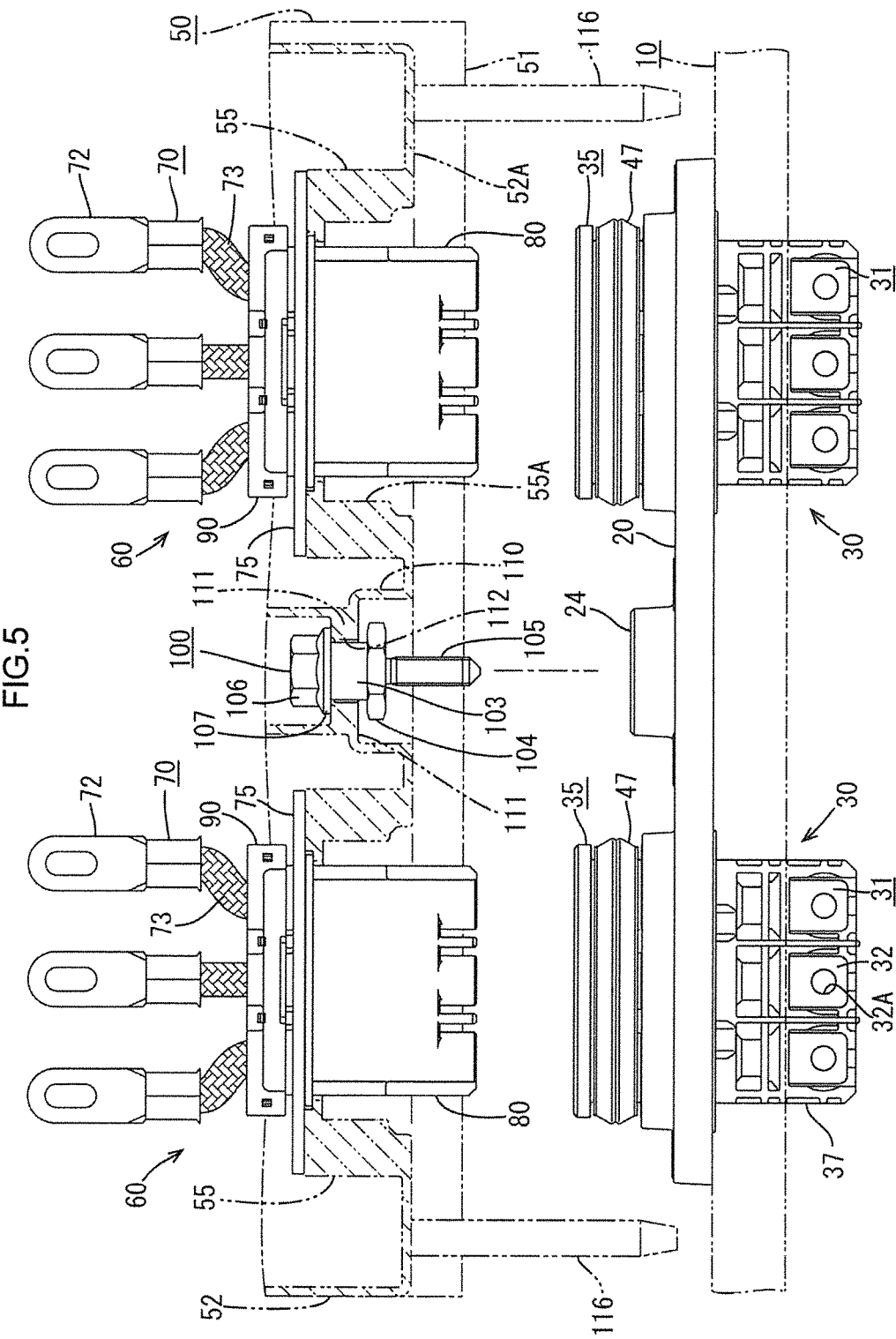
FIG. 5 is a front view of the motor-side connector and the inverter-side connector before being fitted together.
Figure 6:
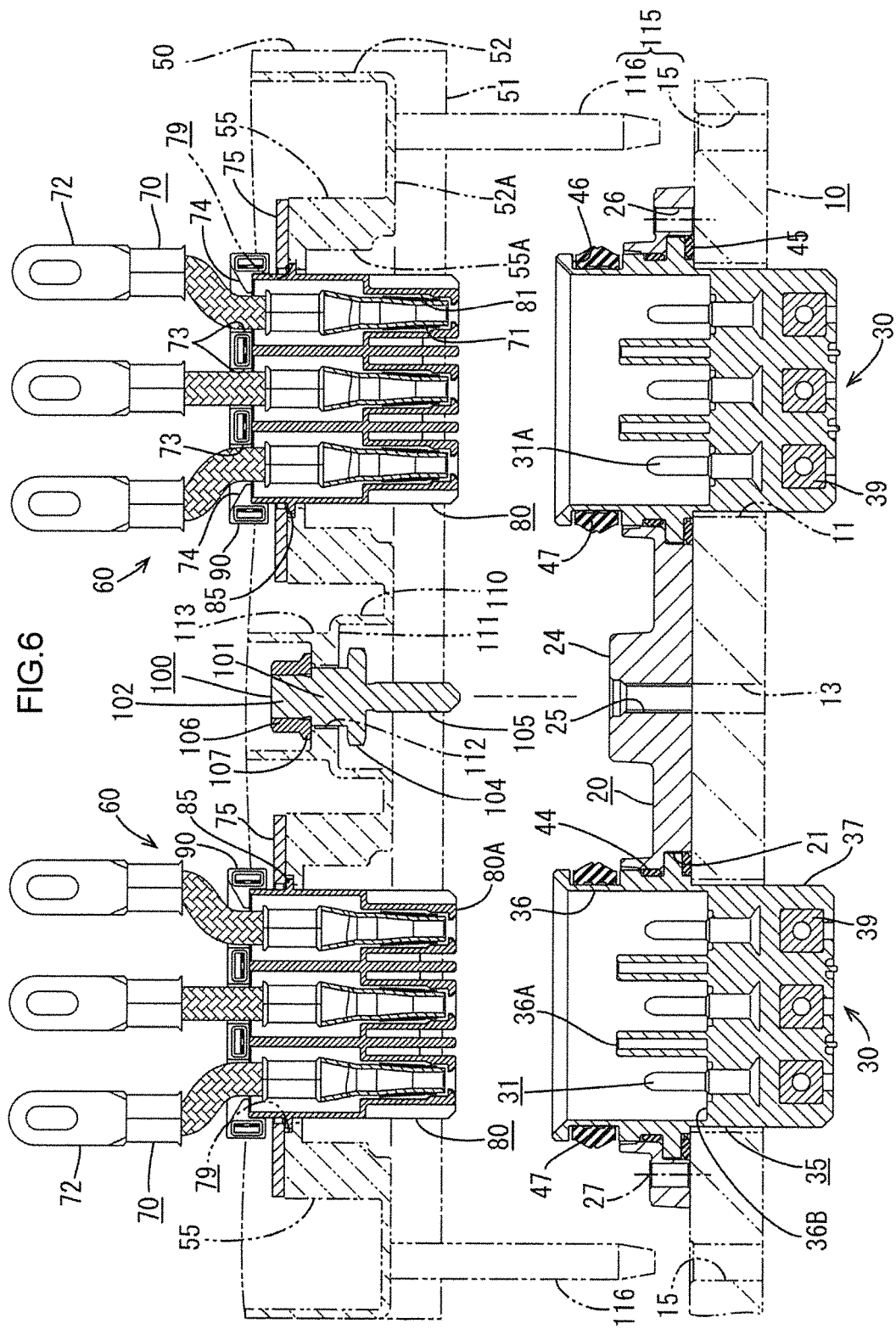
FIG. 6 is a front cross sectional view of the motor-side connector and the inverter-side connector (cross section taken along lines VI-VI of FIG. 3 and FIG. 4).
Figure 7:
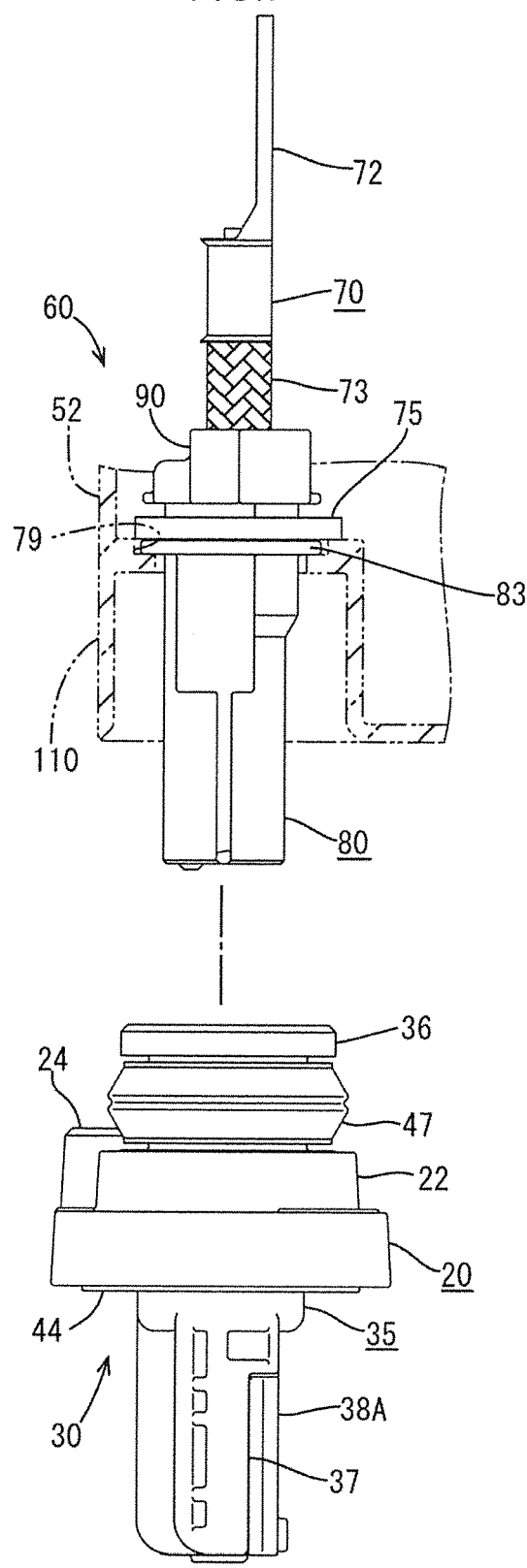
FIG. 7 is a side view of the motor-side connector and the inverter-side connector.

In this embodiment, as illustrated in FIG. 5 and FIG. 6, motor-side connectors 30 are attached to a motor case 10 constituting a motor. To an inverter case 50 constituting an inverter PCU (hereafter simply referred to as the inverter), inverter-side connectors 60 are attached, vertically facing the motor-side connectors 30. When the inverter case 50 is placed on the motor case 10 and coupled therewith, the motor-side connectors 30 and the inverter-side connectors 60 are attached to each other.

In the present embodiment, two motor-side connectors 30 and two inverter-side connectors 60 are provided, each having three poles. In other words, there are provided two, right and left, sets of the motor-side connectors 30 and the inverter-side connectors 60 opposing each other.

Figure 1:
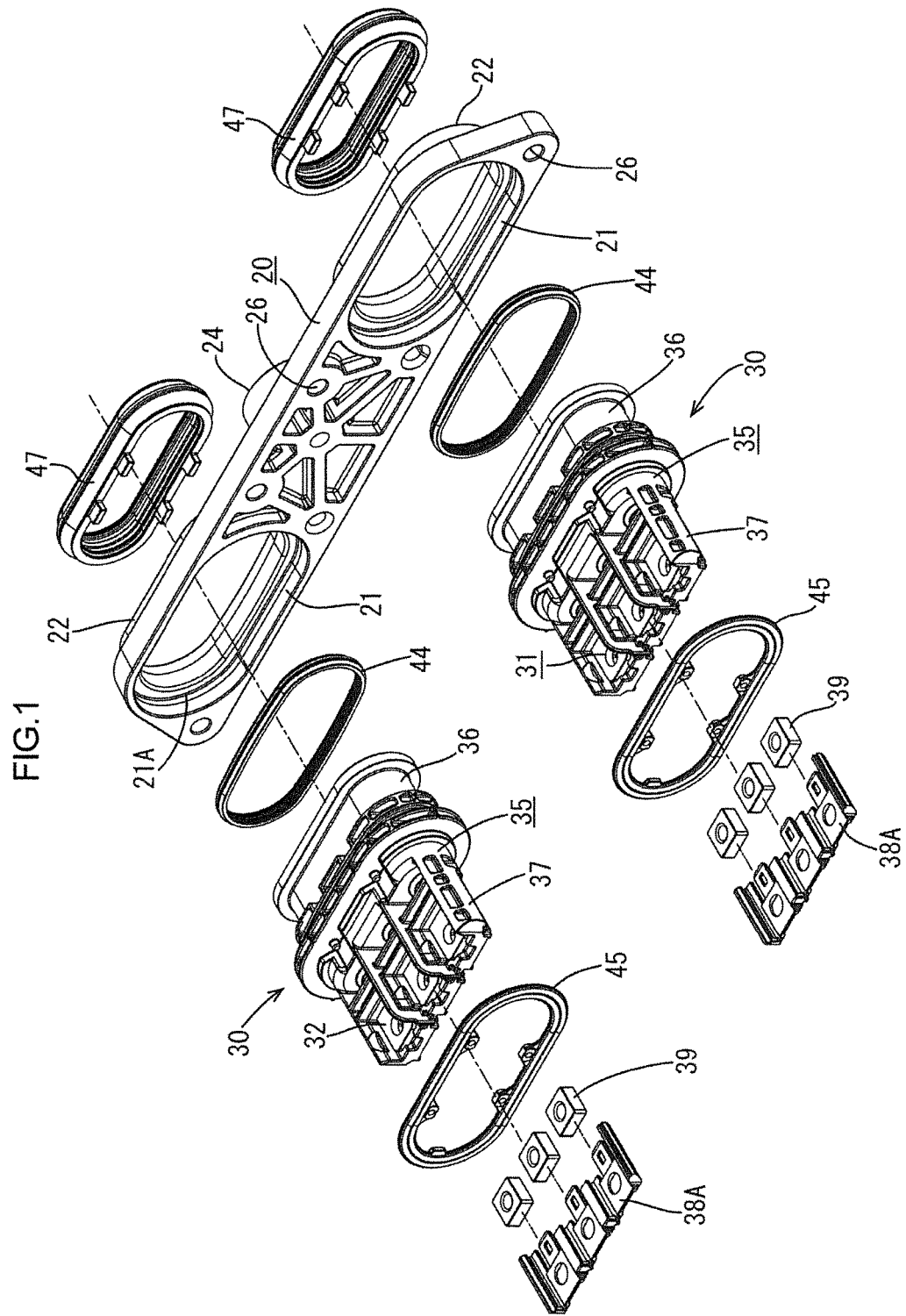
FIG. 1 is an exploded perspective view of a motor-side connector according to an embodiment 1 of the present invention.
Figure 8:
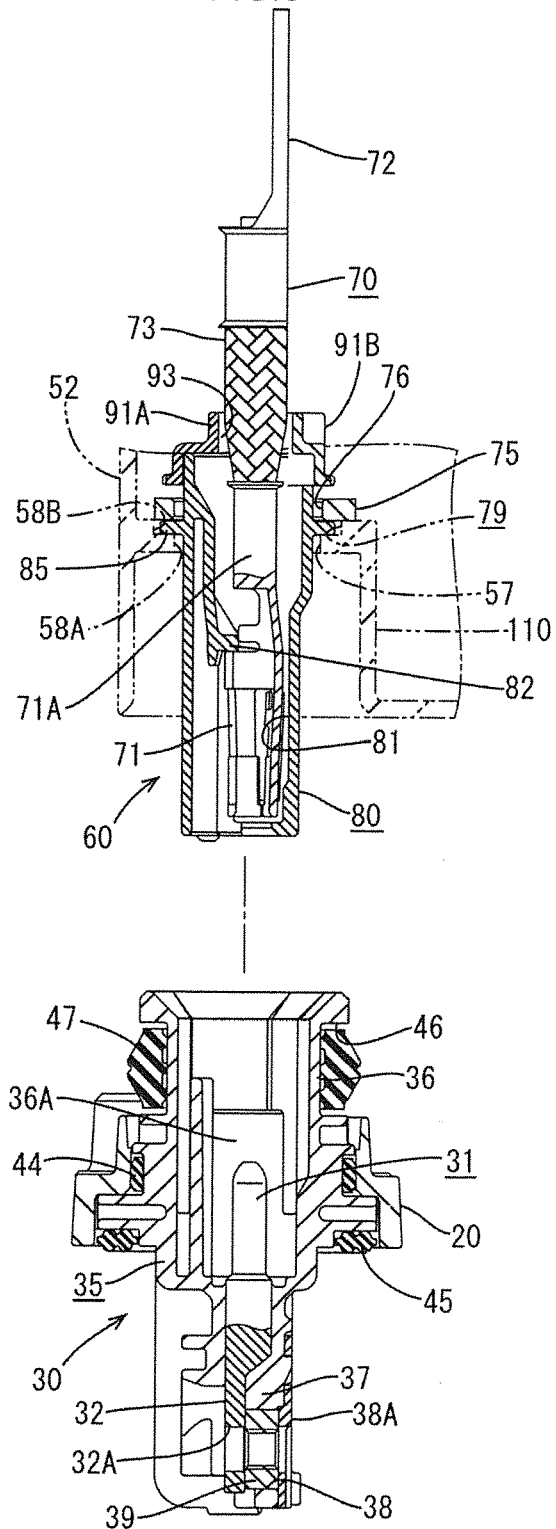
FIG. 8 is a side cross sectional view of the motor-side connector and the inverter-side connector (cross section taken along lines VIII-VIII of FIG. 3 and FIG. 4).
Figure 10:
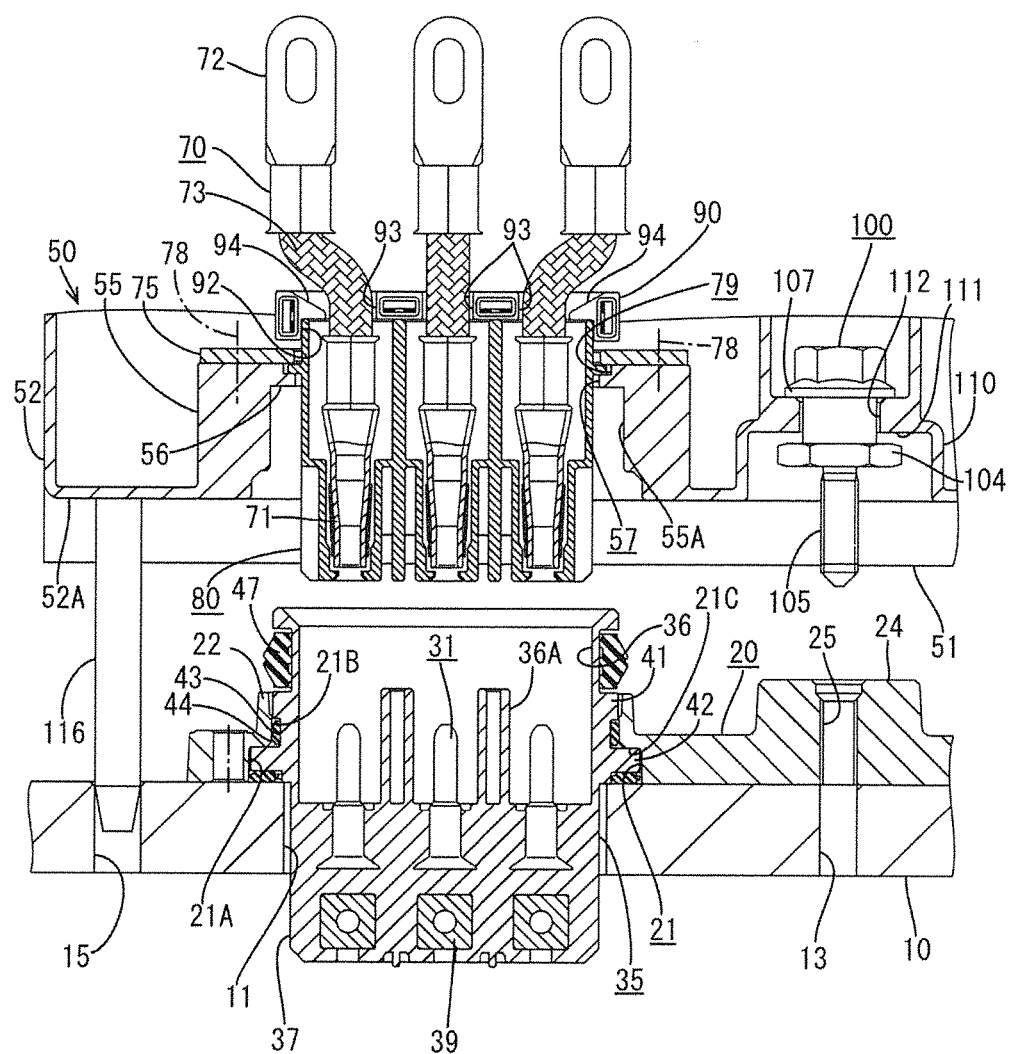
FIG. 10 is a partial cross sectional view illustrating a state immediately before the start of fitting of the motor-side connector and the inverter-side connector in a fitting step.

The motor side will be described. As illustrated in FIG. 1, FIG. 8, and FIG. 10, the motor-side connectors 30 are each formed with three motor-side terminals 31 embedded in a synthetic resin male housing 35 by insert molding. The motor-side terminals 31 are male terminals including round pins with connecting plate portions 32 formed at the lower end, the connecting plate portions 32 having connecting holes 32A opened therein.

The male housing 35 includes an oval and tubular hood portion 36 having an upper surface opening, and a terminal base 37 continuously provided on a lower surface side of the hood portion 36. In the hood portion 36, two partition walls 36A are formed so as to rise from a bottom surface of the hood portion 36.

In the male housing 35, three motor-side terminals 31 are embedded side by side. The ends of the motor-side terminals 31 respectively protrude into the three regions partitioned by the partition walls 36A in the hood portion 36. The connecting plate portions 32 of the motor-side terminals 31 are disposed side by side while being exposed at the lower end of the terminal base 37.

In the rear sides of the respective connecting plate portions 32 of the terminal base 37, nut accommodating holes 38 are formed. In the respective nut accommodating holes 38, square nuts 39 are non-rotatably accommodated and retained by holders 38A attached to back surfaces thereof.

Figure 3:
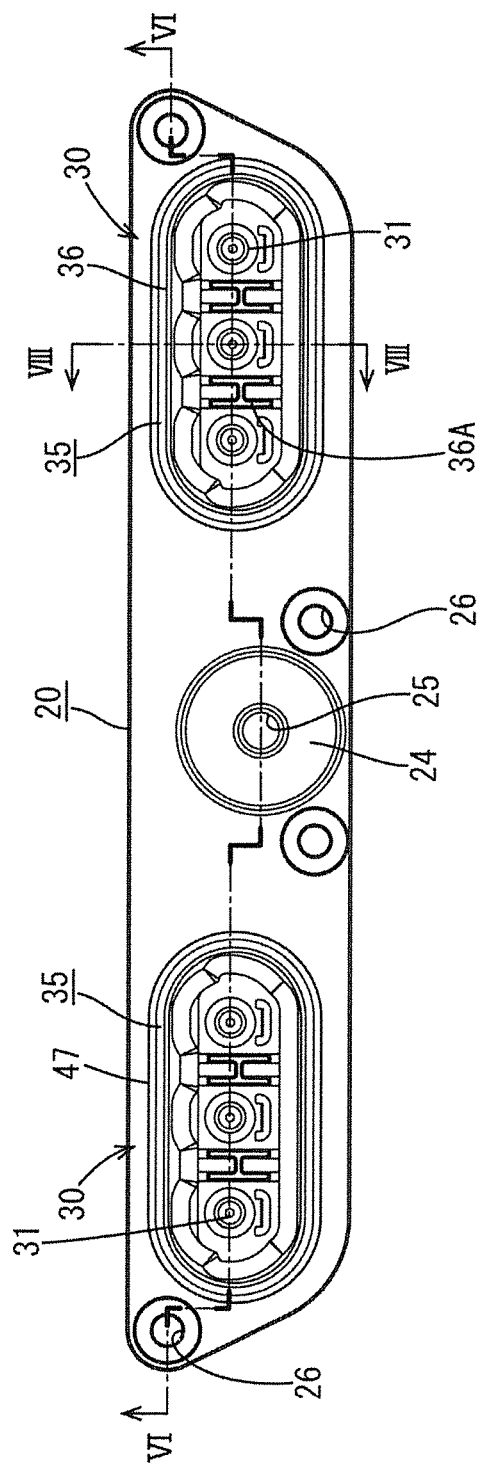
FIG. 3 is a plan view of a motor-side connector attachment structure.

As illustrated in FIG. 3 and FIG. 6, the two motor-side connectors 30 are configured to be attached to the motor case 10 while being held in predetermined positions in a common shield shell 20.

Accordingly, as illustrated in FIG. 10, on the lower end outer periphery of the hood portion 36 of the male housing 35, a small-diameter upper flange 41 and a large-diameter lower flange 42 are formed at a predetermined interval. In a groove portion 43 configured between an inner periphery side of the lower flange 42 and the upper flange 41, a second axial seal 44 is fitted.

The shield shell 20 is made of die-cast aluminum and, as illustrated in FIG. 3, formed in the shape of a thick board with an elongated inverted-trapezoidal planar shape. As illustrated in FIG. 6, in both ends of the shield shell 20 in the longitudinal direction, holding holes 21 into which the motor-side connectors 30 can be attached from below are formed.

As illustrated in FIG. 10, the holding hole 21 is a stepped hole including a large-diameter hole 21A on the lower end side to which the lower flange 42 formed on the male housing 35 is substantially closely attached, and a small-diameter hole 21B on the upper end side to which the upper flange 41 is substantially closely attached. On a hole edge on an upper surface of the small-diameter hole 21B, a peripheral wall 22 is formed so as to rise substantially flush with an inner surface of the small-diameter hole 21B. The large-diameter hole 21A has a greater depth (height) than a thickness of the upper flange 41.

The motor-side connector 30 is fitted into the holding hole 21 of the shield shell 20 from below until the lower flange 42 abuts on a step portion 21C of the holding hole 21 when the upper flange 41 enters an upper end portion of the peripheral wall 22, where the upper end portion of the male housing 35 protrudes above the peripheral wall 22. The second axial seal 44 seals a gap between an outer periphery of the male housing 35 and an inner periphery of the holding holes 21.

On a lower surface of the lower flange 42, a surface seal 45 is attached. The surface seal 45 is pressed onto the hole edge of an upper surface of a mounting hole 11, as will be described below, opened in the motor case 10, to seal the mounting hole 11. In an outer periphery at the end portion of the male housing 35, an attachment groove 46 is circumferentially provided. In the attachment groove 46, a first axial seal 47 is attached to seal a gap from an inner peripheral surface of a fitting recess portion 55A, as will be described below, opened in the inverter case 50.

As illustrated in FIG. 3 and FIG. 6, at the center of the shield shell 20 in the longitudinal direction, a female screw base 24 is formed to protrude at a position closer to a front edge. In the center of the female screw base 24, a screw hole 25 is formed for threaded engagement of a fitting bolt 100, as will be described later, attached to the inverter case 50 side.

In both ends of the shield shell 20 in the longitudinal direction and on both sides of the female screw base 24, i.e., at a total of four locations, bolt insertion holes 26 are opened.

As illustrated in FIG. 6, in the upper surface of the motor case 10, two mounting holes 11 are opened at the same pitch as that of the holding holes 21. Into the mounting holes 11, the lower sides of the male housings 35 protruding downwardly from the holding holes 21 of the shield shell 20 are substantially closely fitted.

The shield shell 20 is placed over the upper surface of the motor case 10 with the lower sides of both male housings 35 fitted in the corresponding mounting holes 11, and is fixed in place when bolts 27 are inserted into the four bolt insertion holes 26 and screwed into screw holes (not illustrated) formed in the motor case 10. The terminal bases 37 of both male housings 35 protrude into the motor case 10.

Specifically, the motor-side connectors 30 are adapted to be fixedly attached via the shield shell 20 while penetrating through the mounting holes 11 opened in the upper surface of the motor case 10.

In the upper surface of the motor case 10, a clearance hole 13 is formed at a position aligned with the screw hole 25 formed in the female screw base 24 of the shield shell 20.

The inverter side will be described.

Figure 2:
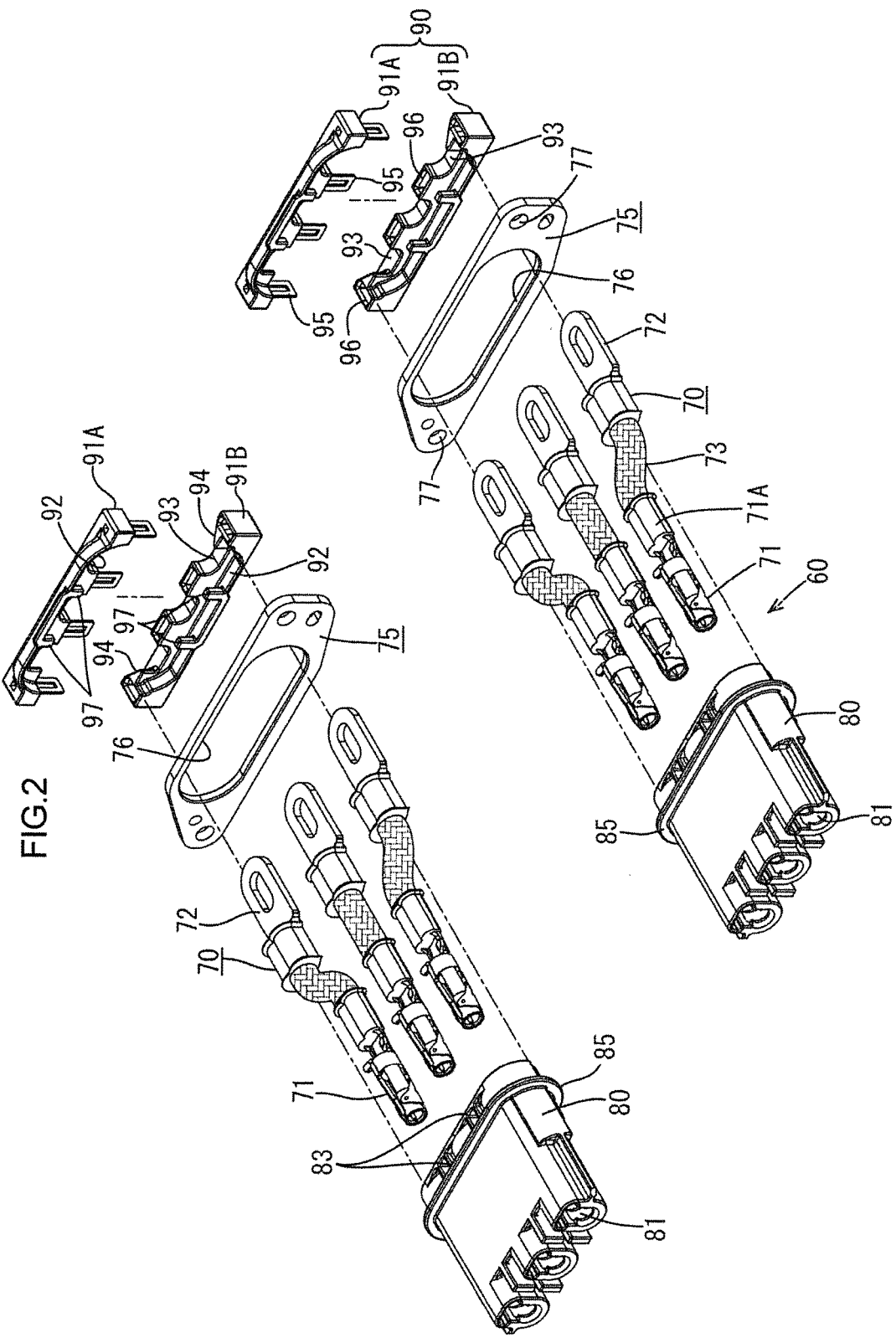
FIG. 2 is an exploded perspective view of an inverter-side connector.

As illustrated in FIG. 2, FIG. 8, and FIG. 10, the inverter-side connectors 60 are each configured of a synthetic resin female housing 80, three inverter-side terminals 70 attached in the female housing 80, and a back retainer 90 for retaining the inverter-side terminals 70. The inverter-side terminals 70 have a structure in which female terminals 71 connected to the above-described motor-side terminals 31 and BA terminals 72 connected to the inverter output terminals (not illustrated) are joined via braided wires 73.

The female housing 80 is formed in a block shape with an oval outline enabling the female housing 80 to fit into the male housing 35 of the motor-side connectors 30. In the female housing 80, three cavities 81 for accommodating the female terminals 71 of the inverter-side terminals 70 are formed side by side.

The back retainer 90 is also made of synthetic resin and, as illustrated in FIG. 2, formed by assembling a pair of divided retainers 91A, 91B. The integrally assembled back retainer 90 is formed in an elongated-square, thick plate shape generally covering the upper surface opening of the male housing 35.

In the lower surface of the integrated back retainer 90, as illustrated in FIG. 10, an oval fitting recess portion 92 having a predetermined depth is formed for closely fitting the upper end portion of the female housing 80. In a roof surface of the fitting recess portion 92, three insertion holes 93 are formed at the same pitch as that of the cavities 81 so as to allow insertion of the ends of the braided wires 73 that are connected to the female terminals 71. Of the three insertion holes 93, the insertion holes 93 at both right and left ends have tapered surfaces 94 where the respective surfaces on the outside in the direction in which the insertion holes are arranged (the left-side surface of the left-end insertion hole 93, and the right-side surface of the right-end insertion hole 93) are upwardly diagonally opened.

As illustrated in FIG. 2, on the divided retainer 91A that is one of the divided retainers 91A, 91B, a total of four locking pieces 95 are formed protruding at both ends of the divided retainer 91A in the longitudinal direction and between the insertion holes 93. On the other divided retainer 91B, four lock receiver portions 96 are formed at corresponding positions to receive and retain the respective locking pieces 95.

From a linear wall surface of the fitting recess portion 92 of each of the divided retainers 91A, 91B, a pair of attachment protrusions 97 is formed in a protruding manner. In each of linear front and rear surfaces at the upper end of the female housing 80, a pair of attachment recess portions 83 is bored for the fitting of the attachment protrusions 97.

When the inverter-side connector 60 is assembled, the female terminals 71 of the inverter-side terminals 70 are inserted into the corresponding cavities 81 of the female housing 80 from above, and primarily locked by lances 82 provided in the cavities 81 (see FIG. 8). Then, the pair of divided retainers 91A, 91B is disposed so as to sandwich the upper end portion of the female housing 80 from the front and rear, and the attachment protrusions 97 are fitted in the attachment recess portions 83. The locking pieces 95 are inserted into the lock receiver portions 96 until the opposing edges are abutted on each other. When the opposing edges are normally abutted on each other, the locking pieces 95 are elastically locked in the lock receiver portions 96, whereby the back retainer 90 is integrally assembled. The back retainer 90 is attached with the upper end portion of the female housing 80 being fitted in the fitting recess portion 92. When the back retainer 90 is attached, barrels 71A at the upper end of the female terminals 71 are locked in hole edges on the lower side of the insertion holes 93 and thus doubly retained.

The braided wires 73 connected to the barrels 71A of the female terminals 71 are pulled up via the insertion holes 93 of the back retainer 90. In the present embodiment, as illustrated in FIG. 5 and FIG. 6, with respect to the three inverter-side terminals 70, the BA terminals 72 are disposed at a greater pitch than that of the female terminals 71. Accordingly, for the two inverter-side terminals 70 at both right and left ends, the respective braided wires 73 need to be bent toward right or left upon exiting the insertion holes 93 of the back retainer 90. Since the insertion holes 93 at the both ends of the back retainer 90 have the tapered surfaces 94, the braided wires 73 can be bent as described above without interference with the inner surfaces of the insertion holes 93.

While the above-described motor-side connectors 30 are fixedly attached to the motor case 10, the inverter-side connectors 60 are attached to the inverter case 50 in a floating state.

As schematically illustrated in FIG. 5, the inverter case 50 has a body case 51, on a front surface side of which a connector attachment case 52 for attachment of the inverter-side connectors 60 (hereafter "attachment case 52") is formed extending with a bottom raised by a predetermined size. Accordingly, the inverter-side connectors 60 are attached to the attachment case 52 in a floating state.

The attachment structure for the inverter-side connectors 60 will be described with reference to FIG. 6 and FIG. 8. The female housing 80 of the inverter-side connector 60 has a flange 85 at a position closer to the upper end, the flange 85 extending along the entire circumference.

At both right and left ends on the bottom surface 52A of the attachment case 52, two mount bases 55 with lower surface openings are formed so as to rise upward. The mount base 55 has a substantially parallelogrammatic planar shape. The interior of the mount base 55 provides the fitting recess portion 55A in which an upper end portion of the male housings 35 of the motor-side connectors 30 is fitted.

A roof wall 56 of the mount base 55 has a support hole 57 in which the female housing 80 is inserted from above and supported. The support holes 57 are disposed at the same interval as the interval of the holding holes 21 opened in the shield shell 20 on the motor side. As illustrated in FIG. 8, the support hole 57 is a stepped hole including a small-diameter hole 58A on the lower side into which the outer periphery of the female housing 80 can be inserted with a clearance, and a large-diameter hole 58B in the upper side into which the flange 85 of the female housing 80 can be inserted with a clearance. The large-diameter hole 58B on the upper side has a depth which is slightly smaller than the thickness of the flange 85.

The right and left side walls of each of the mount bases 55 are thickly formed.

Figure 4:
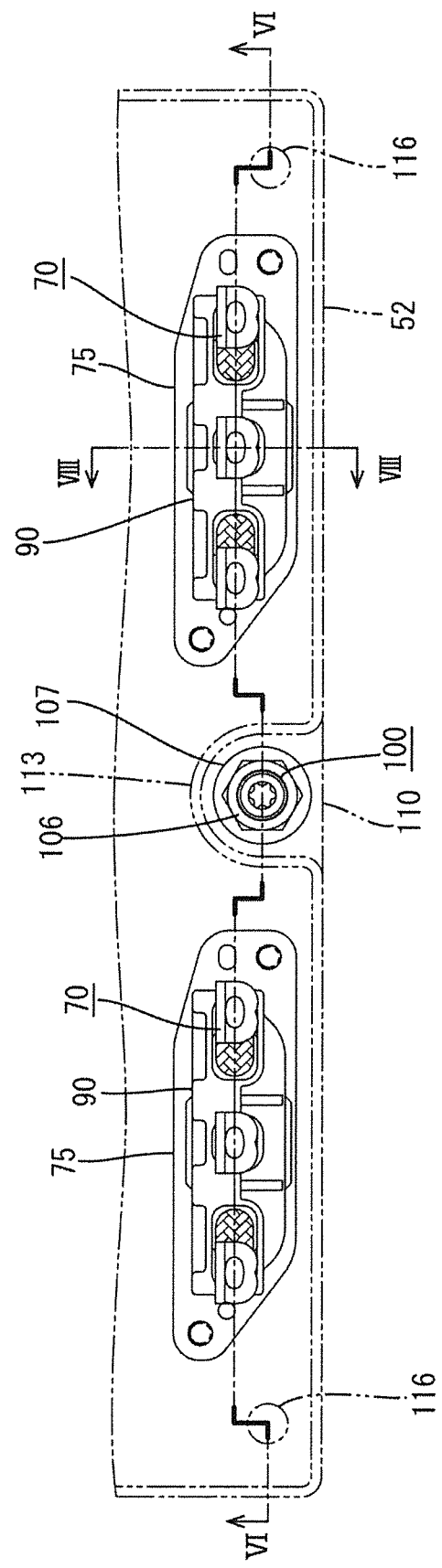
FIG. 4 is a plan view of an inverter-side connector attachment structure.

The mount bases 55 are each adapted to be covered with a metal plate bracket 75. The bracket 75 has a planar shape substantially identical to the upper surface of the mount bases 55. As illustrated in FIG. 5, the bracket 75 has a lock hole 76 into which the outer periphery of the female housing 80 can be inserted with a clearance. As illustrated in FIG. 4, the bracket 75 has screw insertion holes 77 at both ends. By passing screws 78 (see FIG. 10) through the screw insertion holes 77 and threadedly engaging the screws with screw holes (not illustrated) formed in right and left side walls of the mount bases 55, the bracket 75 is fixed in place on the upper surface of the mount bases 55 with the lock hole 76 disposed concentrically with the support hole 57.

In a procedure for attaching the female housing 80, the female housing 80 is inserted into the support hole 57 of the mount base 55 from above, and the flange 85 is received and supported on the hole edge of the small-diameter hole 58A of the support hole 57. Then, the bracket 75 is placed over the upper surface of the mount bases 55 while allowing for insertion of the upper end portion of the female housing 80 into the lock hole 76, and fixed by being fastened by the screws 78. The flange 85 is locked on the hole edge of the lock hole 76, thus preventing the female housing 80 from being pulled upward.

Thus, the female housing 80, with the upper end portion thereof penetrating through the support hole 57 of the mount base 55 and the lock hole 76 of the bracket 75, is supported in such a way as to be radially freely movable by as much as the clearance mainly between the flange 85 and the large-diameter hole 58B. In this way, the female housing 80 is attached in a floating state with respect to the attachment case 52. Accordingly, the support hole 57 in the mount base 55 provided on the attachment case 52, and the lock hole 76 of the bracket 75 fixed on the mount base 55 constitute a mounting hole 79. In the mounting hole 79, the inverter-side connectors 60 penetrate therethrough in a radially freely movable manner and are supported.

In the present embodiment, as partly already described above, when the inverter case 50 is mounted on the motor case 10 and coupled therewith, the motor-side connectors 30 and the inverter-side connectors 60 are fitted together. More specifically, initially, the cases 10, 50 are pulled to each other and thereby the connectors 30, are fitted together by a predetermined amount (temporary fitting-together), using a boosting mechanism of the fitting bolt 100. Finally, the cases 10, 50 are fastened to each other with fastening bolts 120 (see FIGS. 14 and 15) to regularly fit the connectors 30, 60 together (final fitting-together). The structure is described below.

As illustrated in FIG. 4 and FIG. 6, between the mount bases 55 on the bottom surface of the attachment case 52 of the inverter case 50, a pedestal 110 is formed to support the fitting bolt 100 in an axially rotatable manner. The pedestal 110 has a keyhole-like planar shape and is formed so as to rise to substantially the central height position of the mount bases 55, with an open lower surface. A top surface wall 111 of the pedestal 110 has an insertion hole 112 for the fitting bolt 100 formed penetrating therethrough. A protection wall 113 is formed upright from right and left side edges to a rear edge on the upper surface of the top surface wall 111. In other words, the protection wall 113 is formed continuously with a front wall of the attachment case 52, with an open front surface.

Figure 9:
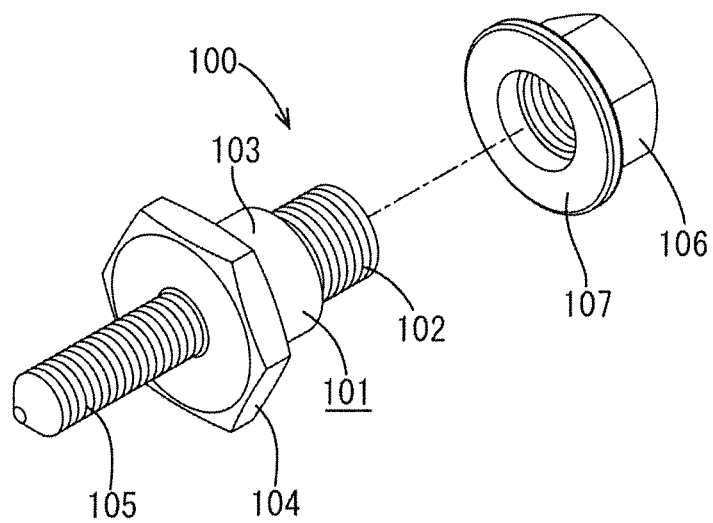
FIG. 9 is an exploded perspective view of a fitting bolt.

As illustrated in FIG. 9, the fitting bolt 100 includes a bolt body 101 and a nut 106 with a flange 107. The bolt body 101 includes, as illustrated in FIG. 5 and FIG. 6, in order from the top, a mount portion 102 with male threads; a large-diameter insertion portion 103; a hexagonal flange 104; and a male screw portion 105. The nut 106 with flange 107 is forcibly screwed onto the mount portion 102 of the bolt body 101 throughout the entire height of the mount portion 102 and is thereby fixedly mounted. In this way, the fitting bolt 100 is formed.

In the thus formed fitting bolt 100, the insertion portion 103 of the bolt body 101 has a diameter enabling insertion into the insertion hole 112 opened in the top surface wall 111 of the pedestal 110 in an axially rotatable manner. The interval between the flange 107 of the nut 106 and the hexagonal flange 104 is set to be greater than a thickness of the top surface wall 111 by a predetermined amount.

When the fitting bolt 100 is attached to the pedestal 110, the bolt body 101 is inserted from below into the insertion hole 112 in the top surface wall 111. In this state, the nut 106 is fixedly mounted onto the mount portion 102 at the upper end of the bolt body 101 protruding above the insertion hole 112, whereby the fitting bolt 100 is formed. When the flange 107 is received on the hole edge of the insertion hole 112 in the top surface wall 111, the fitting bolt 100 is placed in a state of being hung and supported in an axially rotatable manner. In this case, between the hexagonal flange 104 and the lower surface of the top surface wall 111, a predetermined amount of gap is ensured. The lower end of the male screw portion 105 protrudes from the bottom surface 52A of the attachment case 52 by a predetermined size so as to be threadedly engageable in the screw hole 25 of the female screw base 24 provided on the shield shell 20 fixed on the upper surface of the motor case 10.

When the inverter case 50 is mounted on the motor case 10, a positioning mechanism 115 is provided to enable mounting in a predetermined position. As illustrated in FIG. 6, the positioning mechanism 115 includes a pair of positioning pins 116 hanging from both right and left ends of the bottom surface 52A of the attachment case 52 of the inverter case 50, and, on the upper surface of the motor case 10, a pair of positioning holes 15 into which the positioning pins 116 can be closely inserted.

When the inverter case 50 is normally positioned with respect to the motor case 10 and opposed thereto, the inverter-side connectors 60 and the motor-side connectors 30 are set to coaxially oppose each other, and the fitting bolt 100 and the screw hole 25 of the female screw base 24 are set to coaxially oppose each other.

The coupling of the inverter case 50 and the motor case 10 is achieved when the bottom surface of the body case 51 of the inverter case 50 and the upper surface of the motor case 10 are fastened to each other with the fastening bolts 120 at a plurality of locations, such as at four corners.

The details of the step of mounting the inverter case 50 on the motor case 10 and coupling therewith will be described later. First, the manner of engagement of the various portions at predetermined timings in the step will be briefly described.

Figure 11:
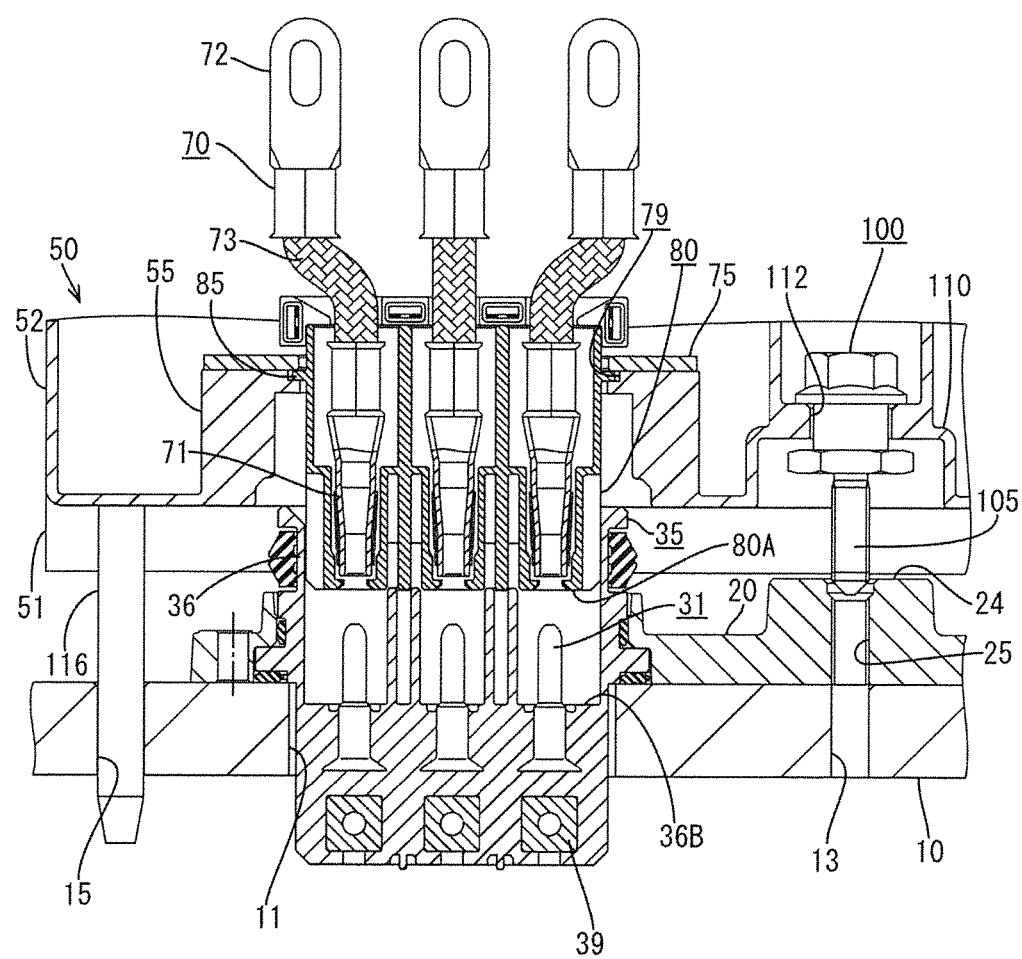
FIG. 11 is a partial cross sectional view illustrating a state in which the fitting bolt is facing a screw hole.

The inverter case 50 is lowered onto the motor case 10 while being guided by the positioning pin 116 being inserted into the positioning hole 15. At the same time, the inverter-side connectors 60 are gradually fitted to the opposing motor-side connectors 30. When the connectors are fitted together by a predetermined amount, as illustrated in FIG. 11, the end of the male screw portion 105 of the fitting bolt 100 faces the entrance to the screw hole 25.

Figure 13:
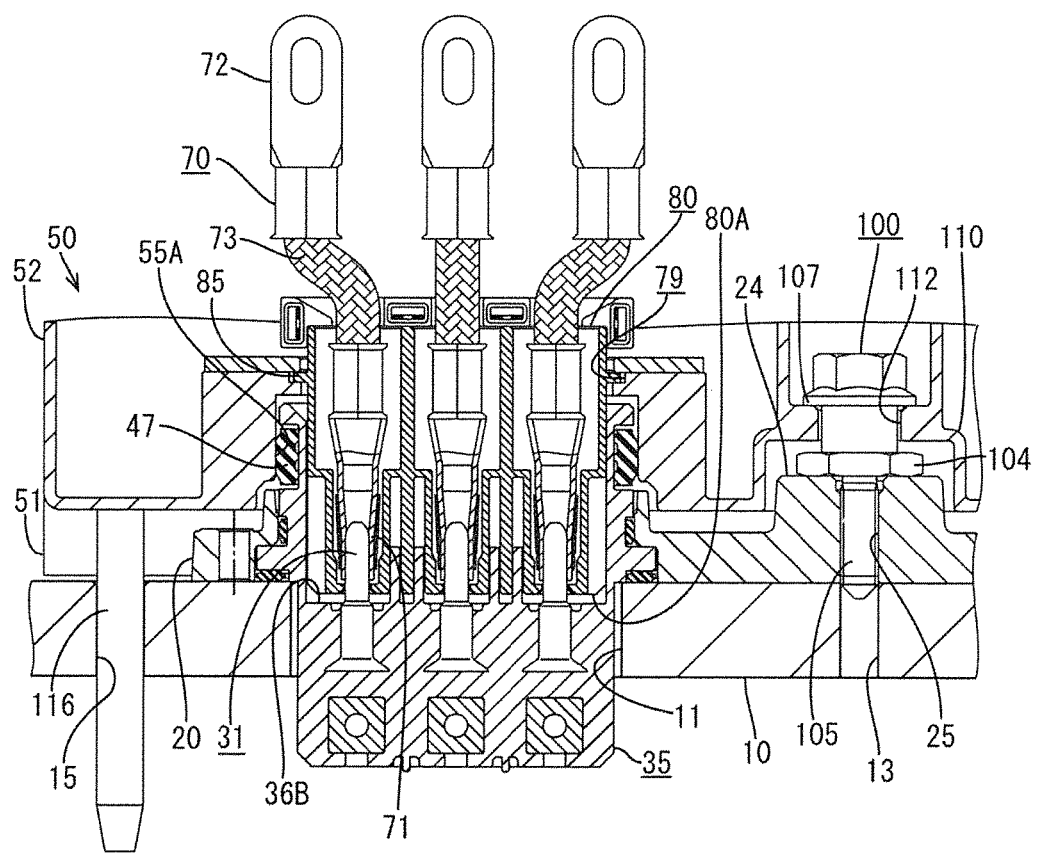
FIG. 13 is a partial cross sectional view illustrating a state at the time of temporary fitting-together.

From this state, by the boosting function of the fitting bolt 100 being screwed into the screw hole 25, the inverter case 50 including the attachment case 52 is pulled toward the upper surface of the motor case 10. As illustrated in FIG. 13, when the hexagonal flange 104 of the fitting bolt 100 is abutted on the upper surface of the female screw base 24, further screwing of the fitting bolt 100, i.e., the pulling of the inverter case 50, is stopped.

In this process, the inverter-side connectors 60 are further fitted to the motor-side connectors 30 until a lower surfaces 80A of the female housings 80 reach a position above rear surfaces 36B of the hood portions 36 of the male housings 35 by a predetermined size when the fitting is stopped (temporary fitting-together). Even in the temporarily fitted state of the connectors 30, 60, the female terminals 71 of the inverter-side terminals 70 and the motor-side terminals 31 are set such that a sufficient amount of fitting for obtaining an appropriate continuity state can be ensured. In the state in which the pulling of the inverter case 50 by the fitting bolt 100 is stopped, the bottom surface of the body case 51 of the inverter case 50 is still in a state of being afloat from the upper surface of the motor case 10.

Figure 15:
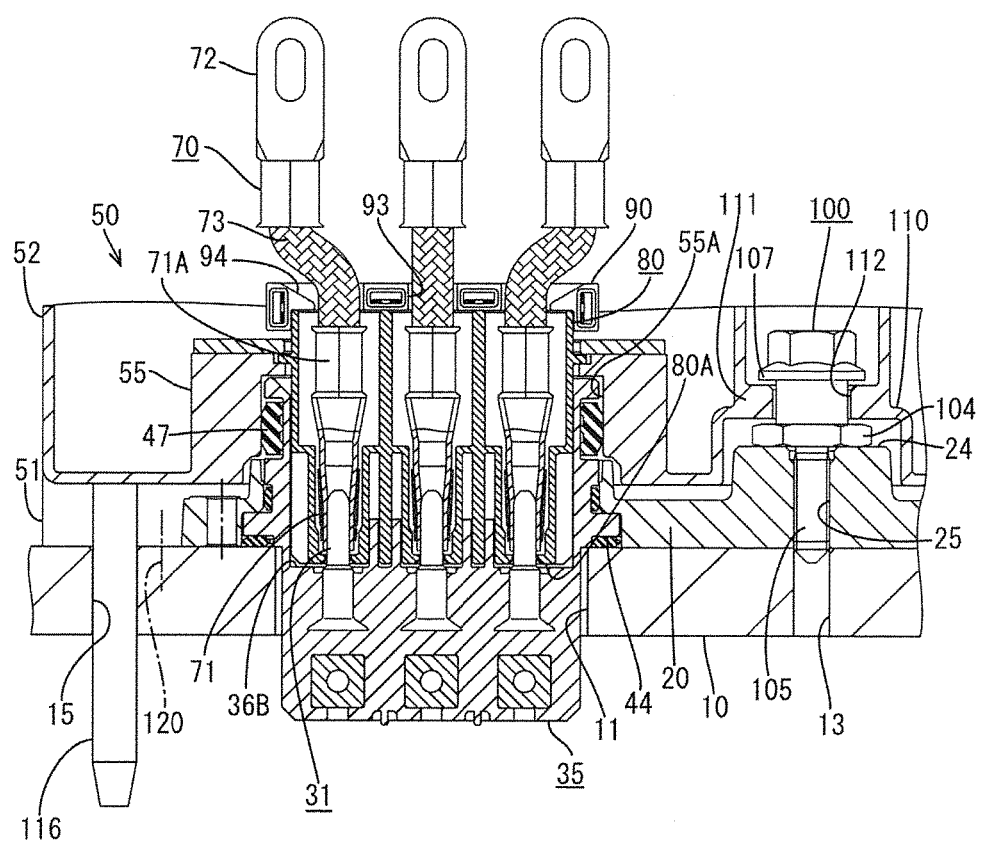
FIG. 15 is a partial cross sectional view illustrating the state at the time of final fitting-together.

Finally, the body case 51 of the inverter case 50 and the motor case 10 are fastened to each other via the fastening bolts 120, and, as illustrated in FIG. 15, the bottom surface of the body case 51 is fixed in a state of being abutted on the upper surface of the motor case 10. As a result, the attachment case 52 is also lowered, whereby the fitting of the inverter-side connectors 60 to the motor-side connectors 30 is slightly advanced (final fitting-together). Even in the final fitted state of the connectors 30, 60, a slight gap is set to be ensured between the lower surfaces 80A of the female housings 80 and the rear surfaces 36B of the hood portions 36 of the male housings 35.

The operation of the present embodiment having the structure described above will be described.

As illustrated in FIG. 6, on the motor side, the two motor-side connectors 30 are held while being water-tightly fitted in the holding holes 21 of the shield shell 20 via the second axial seals 44. The shield shell 20 is fixed onto the motor case 10 with screws, with the lower end portions of the male housings 35 fitted in the mounting holes 11 in the upper surface of the motor case 10. In this way, the motor-side connectors 30 are fixedly attached so as to be arranged in the lateral direction at a certain interval on the upper surface of the motor case 10. The upper hole edges of the mounting holes 11 are sealed with the surface seals 45.

On the other hand, on the inverter side, the two inverter-side connectors 60 are supported while penetrating through the mounting holes 79 formed between the roof walls 56 of the mount bases 55 of the attachment case 52 of the inverter case 50 and the brackets 75 in a radially freely movable manner. That is, the two inverter-side connectors 60 are attached in a floating state. With regard to the three inverter-side terminals 70, the braided wires 73 of the inverter-side terminals 70 on the right and left sides are bent outward, thereby increasing the pitch of the BA terminals 72.

The fitting bolt 100 is hung and supported in a rotatable manner with respect to the pedestal 110.

The inverter-side connectors 60 are fitted to the corresponding motor-side connectors 30 as follows.

From the state illustrated in FIG. 6, the inverter case is positioned by inserting the positioning pins 116 into the positioning holes 15 and lowered onto the motor case 10. As illustrated in FIG. 10, when the positioning pins 116 have entered the positioning holes 15 by a predetermined amount, the inverter-side connectors 60 begin to be fit to the motor-side connectors 30. Even if the inverter-side connectors 60 and the motor-side connectors 30 are misaligned, the inverter-side connectors 60, being supported in a floating state, can freely move radially and be thus aligned. Accordingly, the connectors 30, 60 can be smoothly regularly fitted together.

As illustrated in FIG. 11, when the inverter-side connectors 60 are fitted to the opposing motor-side connectors 30 by a predetermined amount, the end of the male screw portion 105 of the fitting bolt 100 faces the entry of the screw hole 25 cut in the female screw base 24 of the shield shell 20.

Figure 12:
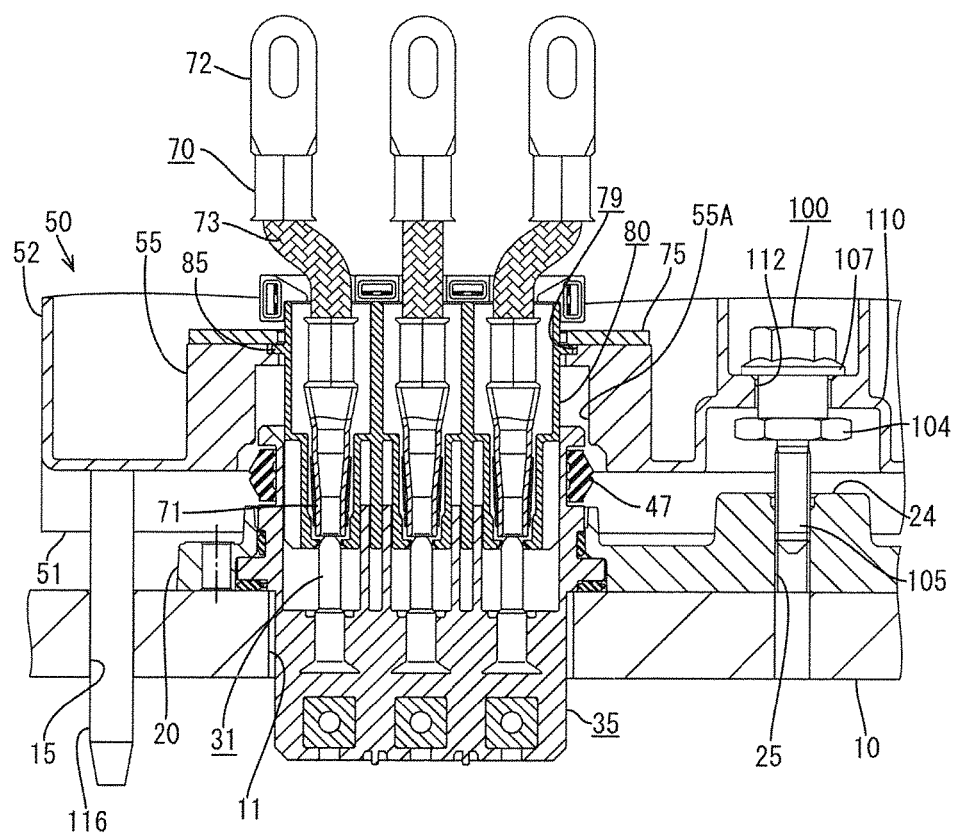
FIG. 12 is a partial cross sectional view illustrating a state in which the fitting bolt is being screwed.

Then, the male screw portion 105 of the fitting bolt 100 is screwed into the screw hole 25 using a tool such as a torque wrench. As a result, due to an associated boosting function, as illustrated in FIG. 12, the inverter case 50 including the attachment case 52 is pulled toward the upper surface of the motor case 10, and also the inverter-side connectors 60 are gradually fitted to the motor-side connectors 30.

When the fitting bolt 100 is further screwed and, as illustrated in FIG. 13, the hexagonal flange 104 of the fitting bolt 100 is abutted on the upper surface of the female screw base 24, further screwing of the fitting bolt 100, i.e., the pulling of the inverter case 50 is stopped.

In this process, the first axial seal 47 fitted on the outer periphery of the upper end portion of the male housing 35 of the motor-side connector 30 is elastically deformed and fitted in the fitting recess portion 55A of the mount base 55, while the inverter-side connectors 60 are further fitted to the motor-side connectors 30. When the lower surface 80A of the female housing 80 has reached a position above the rear surface 36B of the hood portion 36 of the male housing by a predetermined size, the fitting is stopped (temporary fitting-together). At this point, the female terminals 71 of the inverter-side terminals 70 and the motor-side terminals 31 are already in an appropriately connected state. The bottom surface of the body case 51 of the inverter case 50 is still in a floating state from the upper surface of the motor case 10.

When the screwing of the fitting bolt 100 is stopped, a downward force acts on the inverter case 50 due to its own weight. The lowering of the inverter case 50, however, is regulated by a frictional force associated with the fitting together of the inverter-side connectors 60 and the motor-side connectors 30, or a frictional force between the first axial seal 47 and the fitting recess portion 55A. Accordingly, the connectors 30, 60 remain in the temporarily fitted state, and the bottom surface of the body case 51 of the inverter case 50 remains in a floating state from the upper surface of the motor case 10.

Figure 14:
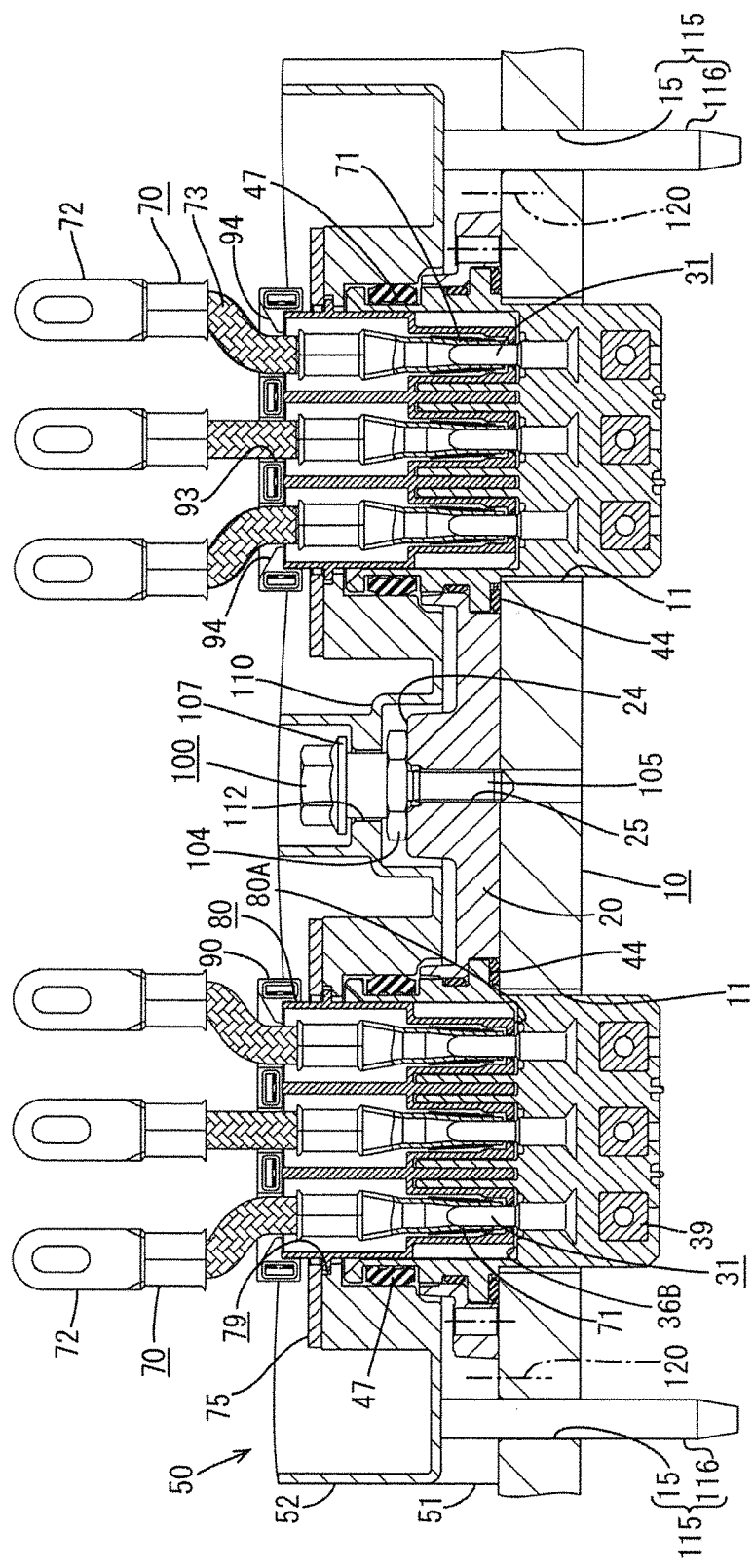
FIG. 14 is a cross sectional view illustrating a state at the time of final fitting-together.

Finally, the body case 51 of the inverter case 50 and the motor case 10 are fastened to each other with the fastening bolts 120 and, as illustrated in FIG. 14 and FIG. 15, fixed to each other with the bottom surface of the body case 51 in contact with the upper surface of the motor case 10. Also, the top surface wall 111 of the pedestal 110, on which the fitting bolt 100 has been hung and supported, is lowered so as to be spaced apart from the flange 107 on the upper side of the fitting bolt 100 while the attachment case 52 is also lowered. The inverter-side connectors 60 are fitted to the motor-side connectors 30 until the lower surfaces 80A of the female housings 80 are very close to the rear surfaces 36B of the hood portions 36 of the male housings 35, i.e., with a slight gap left between the surfaces 80A, 36B (final fitting-together).

The state in which the first axial seals 47 fitted on the male housings 35 of the motor-side connectors 30 are closely attached to the inner periphery of the fitting recess portion 55A of the mount base 55 for sealing the same is also maintained.

In this way, the inverter case 50 is mounted on and coupled with the motor case 10, whereby the operation for fitting the motor-side connectors 30 with the inverter-side connectors 60 is completed.

In the motor case 10, on the terminal bases 37 of the motor-side connectors 30, the input terminals of a motor are engaged on the connecting plate portions 32 of the motor-side terminals 31 and connected using bolts. On the other hand, in the inverter case 50, the BA terminals 72 of the inverter-side terminals 70 are connected to the output terminals of an inverter by screwing using terminal bases, which are not illustrated.

As described above, according to the present embodiment, even at the point in time when the fastening of the motor case 10 and the inverter case 50 with the fastening bolts 120 is completed with the motor-side connectors 30 and the inverter-side connectors 60 finally fitted together, a gap is set to be ensured between the lower surfaces 80A of the female housings 80 of the inverter-side connectors 60 and the rear surfaces 36B of the hood portions 36 of the motor-side connectors 30 in the male housings 35. Accordingly, even if the inverter-side connectors 60 or the motor-side connectors 30 are mounted with a positional displacement in a direction toward the opposite connectors with respect to the inverter case 50 or the motor case 10, the cases 10, 50 are fastened to each other with the fastening bolts 120 before the opposing surfaces 36B, 80A of the connectors 30, 60 are abutted on each other. As a result, the connectors 30, 60 can be regularly fitted together while avoiding the connectors 30, 60 being subjected to excessive load or the cases 10, 50 being subjected to bending stress.

In the present embodiment, the cases 10, 50 are initially pulled to each other using the boosting mechanism of the fitting bolt 100, and the connectors 30, 60 are fitted to each other by a predetermined amount (temporary fitting-together). Then, finally, the cases 10, 50 are fastened to each other with the fastening bolts 120 so as to regularly fit the connectors 30, 60 together (final fitting-together). This has the following significance.

If the inverter case 50 (body case 51) is to be set to be pulled to the motor case 10 using the fitting bolt until the cases are completely stacked one above the other and then fastened together, the following problem may be encountered.

For example, because the inverter case 50 is large by itself, molding variations could be introduced in the interval in the height direction between the abutting surface of the attachment case 52 with respect to the motor case 10 (shield shell 20) and the abutting surface of the body case 51 (the bottom surface of the body case 51) with respect to the motor case 10 in the fastened position of the fitting bolt.

Accordingly, if the interval between the abutting surfaces is greater than a setting, when the fastening of the fitting bolt is completed, the body case 51 would stay in the floating state from the motor case 10 in the fastened position of the fastening bolts 120. As a result, when the cases 51, 10 are later fastened to each other with the fastening bolts 120, a stress may develop at the fastened position of the fitting bolt.

A similar event may occur when the bottom surface of the body case 51 is deformed diagonally such that the fastened position of the fastening bolts 120 is higher.

In contrast, the present embodiment is structured such that, at the time of completion of the fastening of the fitting bolt 100 (temporary fitting-together), the body case 51 of the inverter case 50 is still in a floating state from the motor case 10, and the lowering of the attachment case 52 is permitted in the fastened position of the fitting bolt 100. Accordingly, the inverter case 50 (body case 51) and the motor case 10 can be fastened to each other while avoiding a stress being applied to the fastened position of the fitting bolt 100, and the connectors 30, 60 can be regularly fitted together (final fitting-together).

Figure 16:
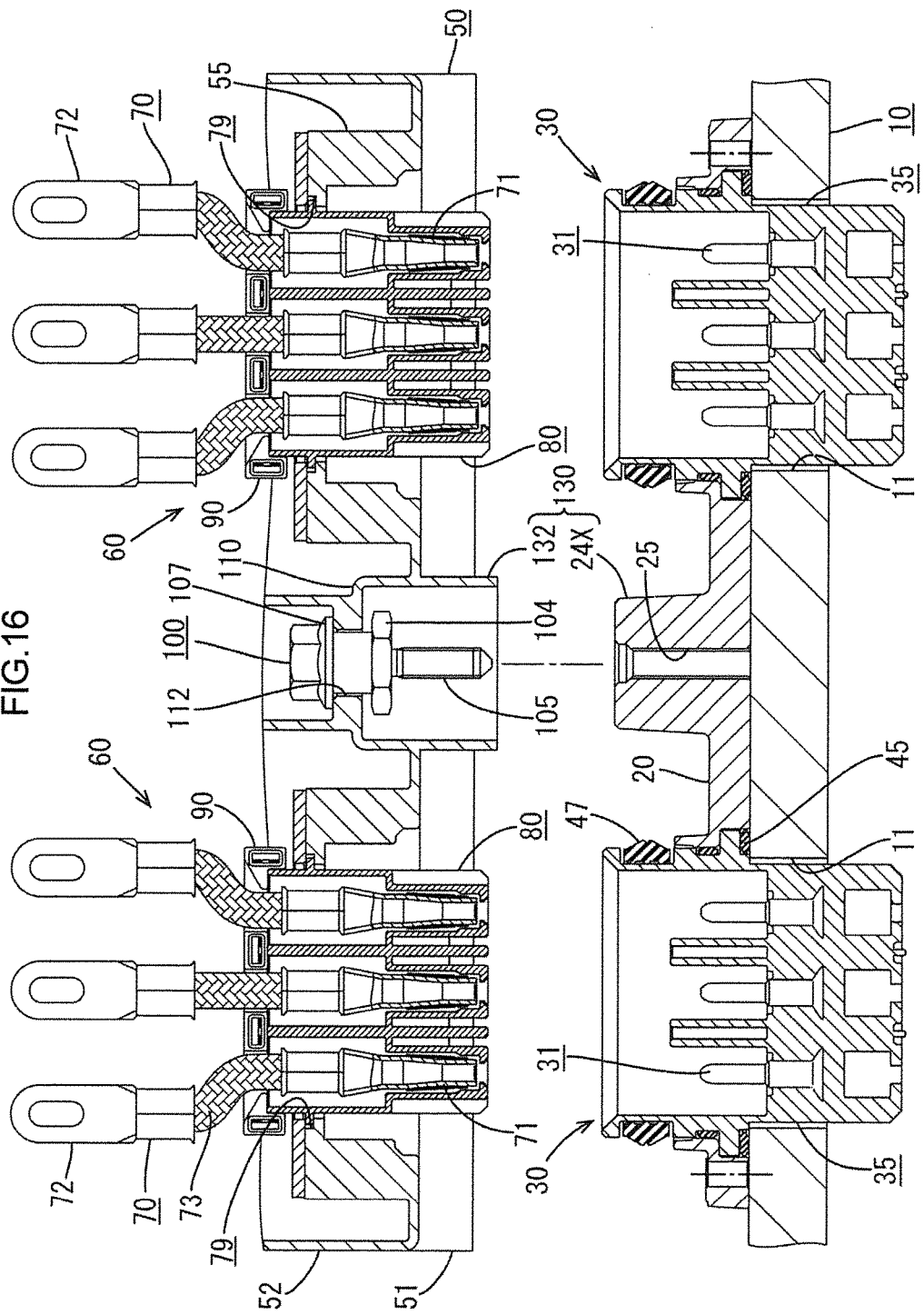
FIG. 16 is a front cross sectional view prior to fitting together the motor-side connector and the inverter-side connector according to a second embodiment.

A second embodiment of the present invention will be described with reference to FIG. 16 and FIG. 17. The second embodiment involves a modification to a positioning mechanism 130 for positioning and mounting the inverter case 50 on the motor case 10.

In the second embodiment, the shield shell 20 is provided with a female screw base 24X threaded with a screw hole 25. The female screw base 24X is formed higher than the female screw base 24 of the first embodiment. The pedestal 110 supporting the fitting bolt 100 in the attachment case 52 of the inverter case 50 has an extended lower end, forming a positioning cylinder 132 to be externally fitted on the female screw base 24X. The positioning cylinder 132 and the female screw base 24X constitute the positioning mechanism 130.

Figure 17:
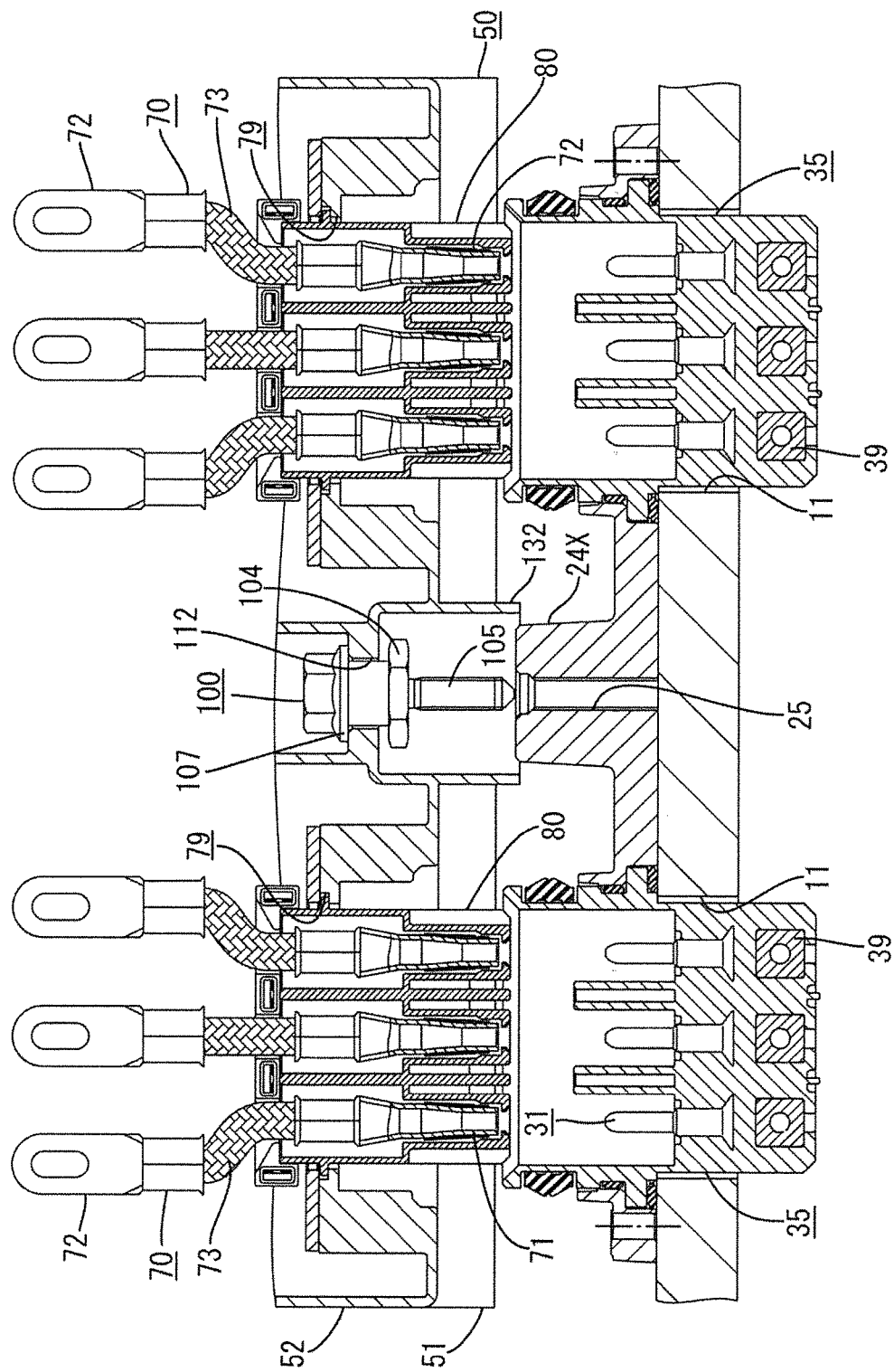
FIG. 17 is a front cross sectional view illustrating a state of being positioned.

As illustrated in FIG. 17, in the positioning mechanism 130, when the lower end of the positioning cylinder 132 is fitted on the upper end of the female screw base 24X, the inverter case 50 is positioned such that the two sets of inverter-side connectors 60 and motor-side connectors 30 are coaxially positioned.

The other structures are similar to those of the first embodiment, and the portions or members having similar functions with those of the first embodiment are designated with similar reference signs and their overlapping descriptions are omitted.

According to the present embodiment, when the inverter case 50 is stacked on the motor case 10, the inverter case 50 is positioned by the positioning mechanism 130, whereby the inverter-side connectors 60 and the corresponding motor-side connectors 30 are aligned. While the structure is simple with the positioning mechanism 130 disposed at a single location between the two sets of connectors 30, 60, the sets of connectors 30, 60 can be accurately aligned. Because the positioning mechanism 130 is provided in a dead space where the fitting bolt 100 and the screw hole 25 are disposed, a space-saving contribution can be made.

The present invention is not limited to the embodiment explained in the above description and described with reference to the drawings, and may include the following exemplary embodiments in the technical scope of the present invention:

While in the embodiment two sets of opposed motor-side connectors and inverter-side connectors are described, the present invention may be similarly applied to one set of a motor-side connector and an inverter-side connector.

The positioning mechanism illustrated in the second embodiment is particularly effective in the case where the motor-side connectors and the inverter-side connectors are provided in two sets.

The amount of threaded advancement of the fitting bolt into the screw hole may be regulated by other means, such as by limiting the depth of the screw hole.

The inverter-side connectors may be fixedly provided with respect to the inverter case.

EXPLANATION OF SYMBOLS

10: Motor case
11: Mounting hole
20: Shield shell
24, 24X: Female screw base (regulating portion)
25: Screw hole
30: Motor-side connector
31: Motor-side terminal
35: Male housing
36B: Rear surface (of the hood portion 36 of the male housing 35) (opposing surface)
50: Inverter case
51: Body case
52: Attachment case
55: Mount base
60: Inverter-side connector
70: Inverter-side terminal
79: Mounting hole
80: Female housing
80A: Lower surface (of the female housings 80) (opposing surface)
100: Fitting bolt
104, 107: Flange
110: Pedestal
111: Roof wall (of the pedestal 110) (wall portion)
112: Insertion hole
120: Bolt
130: Positioning mechanism
132: Positioning cylinder

The invention claimed is:

1. A connector device comprising:
a motor case including a female screw base having a screw hole therein, and the motor case further including a motor-side connector that has a motor side terminal;
an inverter case including a top wall opposing the female screw base and an insertion hole formed through the top wall at a position aligned with the screw hole in the female screw base, the inverter case further including an inverter-side connector that has an inverter side terminal; and
a fitting bolt including a bolt body formed with opposite first and second ends and a flange between the first and second ends, a threaded mount portion between the flange and the first end of the fitting bolt, and a male screw portion between the flange and the second end of the fitting bolt, portions of the bolt body adjacent the male screw portion being inserted into the insertion hole in the top wall of the inverter case so that the male screw portion projects above an upper surface of the top wall of the inverter case, and a flanged nut threadedly engaged with the mount portion and being received on the upper surface of the top wall of the inverter case, wherein: the male screw portion is threaddedly engaged in the screw hole formed in the female screw base, the bolt body is dimensioned such that a predetermined amount of gap is ensured between the flange of the bolt body and a lower surface of the top wall of the inverter case, and the threaded engagement of the male screw portion into the screw hole in the female screw base is stopped when the flange of the bolt body is abutted on an upper surface of the female screw base,
the motor-side connector and the inverter-side connector being fitted together when the inverter case is stacked on and fastened to the motor case by bolting,
wherein a predetermined gap is ensured between opposing surfaces of the motor-side connector and the inverter-side connector when the fastening of the motor case and the inverter case is completed.

2. The connector device according to claim 1, wherein the inverter case is set to be pulled to a position before being stacked on the motor case when the threaded engagement of the male bolt portion is stopped.

3. The connector device according to claim 2, wherein:
the motor case includes two of the motor-side connectors, and the inverter case includes two of the inverter-side connectors, the motor-side connectors and the inverter-side connectors opposing each other; and
the fitting bolt is between the inverter-side connectors and the screw hole is between the motor-side connectors such that the fitting bolt and the screw hole are opposite each other.

4. The connector device according to claim 3, further comprising a positioning mechanism disposed at the fitting bolt and the screw hole, the positioning mechanism positioning the inverter-side connectors and the motor-side connectors to be fit each other and opposite each other to be coaxially disposed when the inverter case is stacked on the motor case.

5. The connector device of claim 1, wherein the flange is integral with the bolt body.

* * * * *